United States Patent [19]

Lambert et al.

[11] Patent Number: 4,726,882
[45] Date of Patent: Feb. 23, 1988

[54] PRODUCT AND METHOD OF CONTINUOUSLY MANUFACTURING THIN POROUS CONDUCTIVE STRIPS BY PAPER-MAKING TECHNIQUES AS ELECTRODES FOR FUEL CELLS

[75] Inventors: Claude Lambert; Alexis Tissier, both of Saint Michel Sur Orge, France

[73] Assignee: Alsthom & CIE., Paris, France

[21] Appl. No.: 399,521

[22] Filed: Jul. 19, 1982

Related U.S. Application Data

[63] Continuation of Ser. No. 196,631, Oct. 14, 1980, abandoned.

[30] Foreign Application Priority Data

Oct. 18, 1979 [FR] France .................................. 79 25878

[51] Int. Cl.⁴ ............................................. D21F 11/00
[52] U.S. Cl. ..................................... 162/123; 162/129; 162/138; 162/146; 162/181.1; 162/181.9
[58] Field of Search ............... 162/123, 129, 138, 146, 162/157.1, 181.1, 181.9

[56] References Cited

U.S. PATENT DOCUMENTS

| | | | |
|---|---|---|---|
| 3,265,557 | 8/1966 | De Fries et al. | 162/146 |
| 3,269,889 | 8/1966 | Hutchins | 162/138 |
| 3,367,851 | 2/1968 | Filreis et al. | 162/138 |
| 3,690,975 | 9/1972 | Groombridge | 162/157.1 |

Primary Examiner—Peter Chin
Attorney, Agent, or Firm—Kenyon & Kenyon

[57] ABSTRACT

A method of continuously manufacturing thin porous conductive strips, the strips including at least one layer based on a substance which contains carbon and a binder, the method comprising the successive steps of:
preparing a very dilute aqueous dispersion of carbon or graphite fibers;
adding an aqueous binder emulsion to the dispersion;
initiating precipitation of a part of the binder onto the fibers;
spreading the mixture in the form of a layer (1,2);
removing at least some of the water from the mixture (3);
drying the mixture (4,5,6,7); and
setting the layer to the required thickness (8) which may be less than a few tens of microns.

5 Claims, 1 Drawing Figure

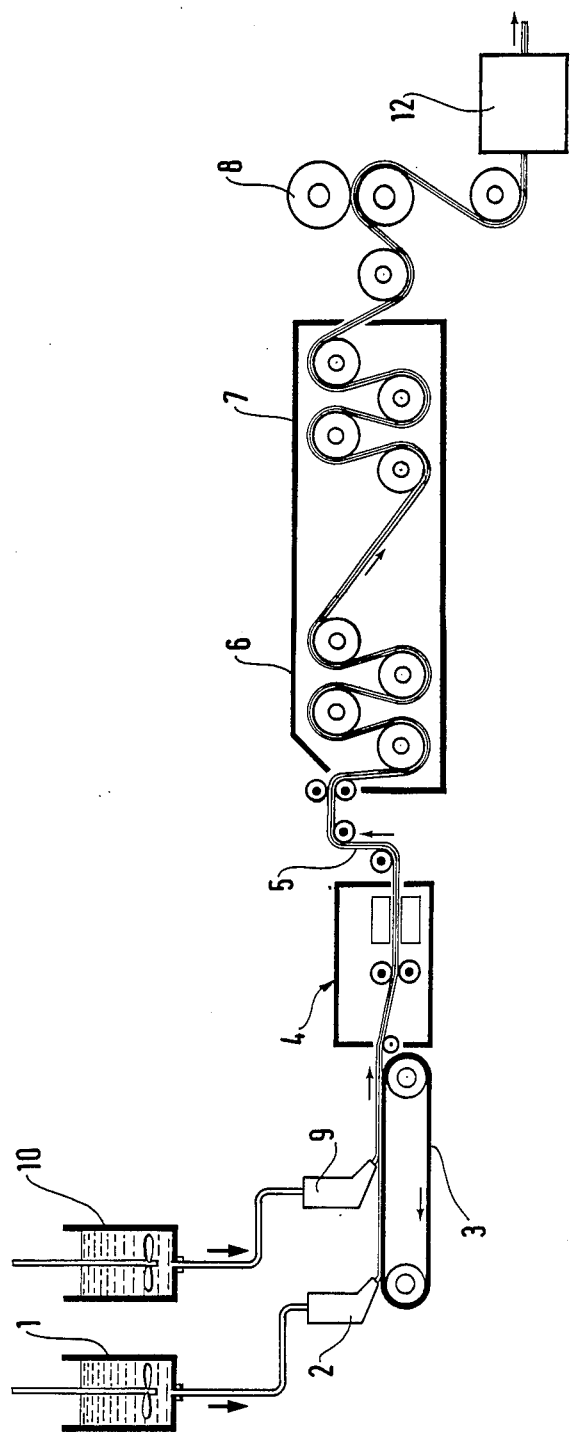

PRODUCT AND METHOD OF CONTINUOUSLY MANUFACTURING THIN POROUS CONDUCTIVE STRIPS BY PAPER-MAKING TECHNIQUES AS ELECTRODES FOR FUEL CELLS

This is a continuation of application Ser. No. 196,631 filed Oct. 14, 1980 and now abandoned.

The present invention relates to a method of continuously manufacturing thin, porous, conductive strips by means of a paper-making technique.

It also relates to the product obtained by using said method, and in particular to carbon-based electrodes for fuel cells.

BACKGROUND TO THE INVENTION

It is known to produce porous strips by means of a paper-making technique, said strips including fibres such as cellulose fibres, and their porosity generally being adjusted by a pore-forming product.

Such fibres made by said paper-making technique are suitable for developing both physical and chemical links between one another so as to form a felt with good mechanical properties.

However, when it is required to apply such a technique to carbon or graphite fibres, in particular for producing electrodes for fuel cells, it is impossible to obtain layers which have sufficient cohesion.

Such an impossibility results in particular from the linear structure of the carbon fibres and from the lack of chemical links between fibres which make it impossible for said fibres to branch out into each other to form an assembly which has satisfactory cohesion.

For electrode production, adding cellulose fibres to the carbon fibres has been proposed; however, very thin strips cannot be obtained by this method and further, electron conductivity is low since the points of contact between the conductive fibres are then very few.

The applicants have succeeded in contriving a paper-making technique for continuously producing thin, porous, conductive strips based on carbon or graphite fibres on an industrial scale, said strips possibly comprising a plurality of very thin layers, and said method avoiding the use of poreforming products, water being the only dispersive agent used.

Purely by way of non-limiting illustration, the method of the invention can be used to manufacture electrodes for electric cells, and in particular for fuel cells, in which current is drawn by means of a collector of electronic conductivity having points or lines of contact spaced apart at a distance of about one millimeter.

SUMMARY OF THE INVENTION

The invention therefore provides a method of continuously manufacturing thin porous conductive strips, said strips including at least one layer based on a substance which contains carbon and a binder, said method comprising the successive steps of:

preparing a very dilute aqueous dispersion of carbon or graphite fibres;

adding an aqueous binder emulsion to the dispersion;

initiating precipitation of a part of said binder onto said fibres;

spreading said mixture in the form of a layer;

removing at least some of the water from the mixture;

drying the mixture; and setting the layer to the required thickness, which may be less than a few tens of microns.

Preferably the said layer includes a proportion by weight of said binder which lies between 20 and 99% and preferably between 70 and 95%.

DRAWING

An example of the invention is described with reference to the sole FIGURE of the accompanying drawing which very schematically illustrates a machine used to put the method of the invention into practice.

DETAILED DESCRIPTION

The starting materials are a dispersion in water of carbon or graphite fibres and an aqueous emulsion of a binder such as polytetrafluoroethylene (PTFE), or polyvinyl chloride.

Said dispersion includes substantially 1/1000 by weight of fibres.

The aqueous binder emulsion is, for example, a commercial PTFE emulsion of the "Soreflon" type which contains about 40% of PTFE by weight. Said emulsion is diluted until its dry extract content is about 5/1000.

The accompanying FIGURE shows a receptacle 1 in which initially the dispersion of carbon or graphite fibres is mixed with the binder emulsion.

Precipitation of some of the binder onto the fibres is then initiated either by mechanical shaking or by addition of cations, in particular the cation $Al^{3+}$, or by heating to a temperature of about 25° to 30° C.

Such a mixture is then transferred to a feed apparatus 2 and applied to an endless screen 3 of a paper-making machine and spread thereover. On one screen 3, a first removal of water is performed by gravity then a second removal of water is performed by a suction apparatus (not shown); this results in the formation of a strip 5 which has excellent cohesion and good mechanical behaviour, from which strip some of the residual water is removed in a press section 4, the strip 5 then being conveyed through two successive driers 6 and 7 in which almost all of the remaining water is removed. Lastly, the strip is set to the required thickness in particular by a cold pass between two rolls 8.

Optionally, it may be conveyed through a furnace 12 for sintering the PTFE.

A very thin and coherent strip is thus obtained; its porosity is adjustable, and it has high electron conductivity and uses a low proportion of carbon fibres while having good mechanical strength. To give a clear idea, with an aqueous dispersion of 7 to 15% of carbon fibres for 93 to 85% of PTFE, the following characteristics were obtained:

Porosity: 60%

Longitudinal resistivity: 0.1 to 0.003 ohm.cm

Thickness less than 100 microns.

Further, the proportion of binder may vary between 20 and 99%.

Further, the characteristics and advantages of the method of the invention should be emphasised.

Water is the only liquid used in the dispersive medium which contains a hydrophobic product, in this case, PTFE or, possibly, PVC.

The thickness can be adjusted merely by varying the spacing of the rolls 8 without requiring any heating. Likewise, porosity can be adjusted simply by adjusting the flow rate of the dispersion and the rotation speed of the rolls 8 without using any pore-forming products.

It should also be observed that the thin strip is formed in the wet state, in particular on the screen 3. The result of this is that multi-layer strips can be produced.

For this purpose, referring to the accompanying drawing, it is sufficient merely to provide a second feed apparatus 9 downstream from the first and fed with a mixture of a dispersion and a suitable binder emulsion contained in a second receptacle 10. It will also be observed that using a binder such as PTFE or PVC makes it possible to carry out all these operations at ambient temperature and without breaking the carbon fibres, which are 1 to 5 mm long and have a diameter of 8 to 12 microns.

Another important feature of the invention ensues from the fact that even in the wet state, the sheet 5 has good cohesion. As set forth hereinabove, this makes it possible to use it as a support for other successive layers which are of different composition and have different properties, said layers being formed simultaneously and themselves being very thin, i.e. less than 20 microns thick.

The manufacture of a two-layer electrode for a fuel cell will therefore be described by way of non-limiting example. The electrode comprises a barrier layer and a catalytic layer.

In such an electrode, the barrier layer, which is conductive, provides electron transfer from the active layer to the collector of the cell, while its porosity allows the reagent gases, e.g. hydrogen and air, to reach said catalytic layer by diffusion at low feed pressure.

Further, the fact that the barrier layer is hydrophobic makes it possible to locate the liquid-gas interface within the active layer.

Now, the conductivity of the active or catalytic layer enables electron transfer from the reaction zones towards the collector via the barrier layer, while its porosity enables ion diffusion to or from the reaction zones, as well as bringing in the reagents.

Of course, it also acts as a catalyst to the electrochemical process.

Such layers are therefore manufactured as previously set forth, using the two feed apparatuses 2 and 9.

More precisely, the apparatus 2 pours a first mixture which is intended to constitute the barrier layer, on which the feed apparatus 9 pours a second mixture which is intended to constitute the catalytic layer. Further, these mixtures are prepared in accordance with the method set forth hereinabove. It should be observed that after the first layer has formed, but while it is still covered with a layer of water, the second mixture of different composition is poured thereon. In the case of a catalytic layer, the different composition may include carbon or graphite powder or fibres associated with a catalyst such as platinum. Some of the second layer mixes with the first layer which is still very porous, yet without destroying it, this subsequently allowing improved cohesion between the two layers. It is further observed that the water filters through the first layer at a sufficient speed to allow a third layer to be deposited on the second and for the assembly to be able to reach the press section 4 without requiring a mechanical support and without damage.

The layers thus obtained simultaneously may be very thin, i.e. of the order of a few microns thick. Also, they are homogeneous.

Such two-layer electrodes can easily be integrated in filter-press type fuel cells, e.g. of the type described in French patent application No. 74 02 516 of 25th January, 1974, published under No. 2,259,447 and corresponding to U.S. Pat. No. 4,002,493, for "A fuel cell structure and system, more particularly for a carbon fuel and atmospheric air", in which cells the current can be collected by means of collectors with points or lines of contact a few millimeters apart, e.g. by a corrugated bipolar collector.

Generally, such a collector can be made of any conductive material; advantageously, it can be formed by a sheet of plastic material, impregnated with conductive fibres, in particular carbon fibres. The contact between the collector and the electrode is provided either by pressure or, preferably, by bonding (e.g. welding) or by glueing with a conductive glue, preferably an epoxy resin impregnated with carbon.

Further, the applicants were surprised to find that such a way of drawing current from electrodes, such as those produced in accordance with the method of the invention, which have a high proportion of PTFE allows current densities to be obtained which are of the order of 300 mA/cm$^2$ for hydrogen and 200 mA/cm$^2$ for air, thus the carbon fibres are in contact with one another despite the low fibre content.

A few characteristics of electrodes obtained by the method of the invention are described hereinbelow.

EXAMPLE 1

The barrier layer is 150 microns thick and includes 7 to 15% of carbon fibres and 93 to 85% of PTFE. It has a porosity of 30 to 60% and a resistivity of 0.04 to 0.1 ohm.cm.

The catalytic layer is 20 microns thick and contains 60% of PTFE and 40% of carbon, optionally including a catalyst.

Optionally, a third porous layer may be provided which is hydrophilic to act as a membrance or trap for chemical reagents.

EXAMPLE 2

The barrier layer is 77 microns thick, and the catalytic layer is 23 microns thick. It has a platinum content of 150 micrograms/cm$^2$, its resistivity is 0.38 ohm.cm and its porosity is about 50%.

EXAMPLE 3

The barrier layer contains 12% of carbon fibres and 88% of PTFE; the catalytic layer contains 60% of PTFE and 40% of carbon with a 20% platinum content.

The relative thicknesses of these layers are 200 microns and 50 microns respectively.

A third inert and hydrophilic layer is produced which contains asbestos fibres and is 17 microns thick.

It will be observed that the catalytic and barrier layers can contain from 20 to 99% of PTFE as previously stated.

The invention is not limited to producing electrodes for fuel cells but can be extended to producing, for example, heating strips, miscellaneous membranes, non-cloggable filters, traps for chemicals, or chemical reactor components.

We claim:

1. A method of continuously manufacturing thin porous conductive strips, said strips including at least one layer based on a substance which contains carbon and a binder, said method comprising the successive steps of:

preparing a very dilute aqueous dispersion of fibres selected only from the group consisting of conductive carbon fibres and conductive graphite fibres;

adding an aqueous emulsion of a synthetic resin binder to the dispersion;

initiating precipitation of a part of said binder onto said fibres to form a mixture;

spreading said mixture in the form of a layer;

removing at least some of the water from the layer;

drying the layer; and setting the thickness of the layer to a required thickness, the proportion by weight of said binder relative to the total weight of binder and conductive fibres in the layer laying between 20 and 99 percent, the method further comprising preparing an additional mixture in a dilute aqueous dispersion and spreading said additional mixture on the layer formed from said first-mentioned mixture prior to said drying step to form a multi-layer strip.

2. A method according to claim 1, wherein the first layer formed from said first-mentioned mixture is a barrier layer, and the second layer formed from said additional mixture is a catalytic layer, said multi-layer strip being suitable for use as an electrode for a fuel cell.

3. A method according to claim 11, further comprising preparing a third aqueous mixture containing a hydrophilic substance and spreading said third mixture on the second layer prior to said drying step to form a third layer which is made of said hydrophilic substance.

4. A method according to claim 2, wherein said step of preparing the additional mixture for said catalytic layer comprises preparing a very dilute aqueous mixture of a material selected from the group consisting of carbon fibres, graphite fibres, carbon powder, and graphite powder as well as a synthetic resin binder.

5. A method according to claim 2, wherein said step of preparing the additional mixture for said catalytic layer comprises preparing a very dilute aqueous mixture of a material selected from the group consisting of carbon fibres, graphite fibres, carbon powder, and graphite powder as well as a synthetic resin binder, and adding a catalytic activation element to said additional mixture.

* * * * *